(12) United States Patent
Lee et al.

(10) Patent No.: US 12,541,043 B2
(45) Date of Patent: Feb. 3, 2026

(54) LENS, LENS ASSEMBLY, AND MOBILE ELECTRONIC DEVICE

(71) Applicant: Samsung Electro-Mechanics Co., Ltd., Suwon-si (KR)

(72) Inventors: Tae Kyung Lee, Suwon-si (KR); Sang Kee Yoon, Suwon-si (KR); Jin Woo Yi, Suwon-si (KR); Joung Hun Kim, Suwon-si (KR); Jae Goon Aum, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 417 days.

(21) Appl. No.: 18/101,396

(22) Filed: Jan. 25, 2023

(65) Prior Publication Data

US 2023/0350104 A1    Nov. 2, 2023

(30) Foreign Application Priority Data

May 2, 2022    (KR) .................. 10-2022-0054260

(51) Int. Cl.
*G02B 1/18*    (2015.01)
*G02B 1/11*    (2015.01)
*G02B 5/02*    (2006.01)

(52) U.S. Cl.
CPC .................. *G02B 1/18* (2015.01); *G02B 1/11* (2013.01); *G02B 5/0221* (2013.01)

(58) Field of Classification Search
CPC ........... G02B 1/18; G02B 1/11; G02B 5/0221
USPC ........................................... 359/580
See application file for complete search history.

(56) References Cited

U.S. PATENT DOCUMENTS

| | | | |
|---|---|---|---|
| 2004/0091642 A1* | 5/2004 | Murakami | G02B 5/0215 428/1.31 |
| 2007/0217014 A1* | 9/2007 | Fukushige | G02B 1/111 359/582 |
| 2010/0167019 A1 | 7/2010 | Ohyanagi et al. | |
| 2016/0320530 A1 | 11/2016 | Umetani et al. | |
| 2017/0139082 A1* | 5/2017 | Takai | G02B 5/0231 |
| 2018/0162091 A1* | 6/2018 | Takeda | G02B 5/0221 |
| 2018/0185875 A1 | 7/2018 | Murakami et al. | |
| 2020/0166725 A1 | 5/2020 | Park et al. | |
| 2021/0165136 A1 | 6/2021 | Tsai et al. | |
| 2022/0389240 A1* | 12/2022 | Uematsu | C08G 18/7831 |
| 2023/0229036 A1* | 7/2023 | Kuzuhara | H05B 33/02 349/122 |

FOREIGN PATENT DOCUMENTS

CN    107924002 A    4/2018
CN    112882137 A    6/2021
(Continued)

OTHER PUBLICATIONS

WO-2018174049-A1—English translation—Kawagishi—Sep. 2018.*
(Continued)

*Primary Examiner* — Sharrief I Broome
(74) *Attorney, Agent, or Firm* — NSIP Law

(57) ABSTRACT

A lens includes a lens unit including an uneven surface structure, and an uneven layer formed on at least a portion of the uneven surface structure of the lens unit and comprising an uneven surface structure. The uneven surface structure of the lens unit and the uneven surface structure of the uneven layer have different shapes.

28 Claims, 13 Drawing Sheets

A

(56) References Cited

FOREIGN PATENT DOCUMENTS

| JP | 2010-156893 A | | 7/2010 | | |
|----|---------------|---|--------|---|---|
| JP | WO2016/047032 A1 | | 3/2016 | | |
| JP | 2020-30427 A | | 2/2020 | | |
| JP | 2020030427 A | * | 2/2020 | ............... | B32B 7/02 |
| KR | 10-2020-0063522 A | | 6/2020 | | |
| WO | WO 2016/021560 A1 | | 2/2016 | | |
| WO | WO-2018174049 A1 | * | 9/2018 | | |

OTHER PUBLICATIONS

JP-2020030427-A—English translation—Wada—Feb. 2020.*
Korean Office Action issued on Jul. 13, 2023, in counterpart Korean Patent Application No. 10-2022-0054260 (7 pages in English, 5 pages in Korean).
K. Isakov et al., "Superhydrophobic Antireflection Coating on Glass Using Grass-like Alumina and Fluoropolymer," *ACS Applied Materials & Interfaces*, vol. 12, No. 44, pp. 49957-49962, published online Oct. 21, 2020, https://doi.org/10.1021/acsami.0c12465.
Chinese Office Action issued on Nov. 28, 2025, in counterpart Chinese Patent Application No. 202310348248.6 (6 pages in English, 8 pages in Chinese).

* cited by examiner

LENS, LENS ASSEMBLY, AND MOBILE ELECTRONIC DEVICE

CROSS-REFERENCE TO RELATED APPLICATIONS

This application claims the benefit under 35 USC 119(a) of Korean Patent Application No. 10-2022-0054260 filed on May 2, 2022, in the Korean Intellectual Property Office, the entire disclosure of which is incorporated herein by reference for all purposes.

BACKGROUND

1. Field

Examples of the present disclosure relate to a lens, a lens assembly, and a mobile electronic device.

2. Description of Related Art

As functions of a camera in a mobile electronic device such as a mobile phone, a tablet PC, a laptop computer, or other devices have advanced, technology of lenses used therein has also advanced. Lenses may collect or disperse light, and using this function, a lens may enlarge or reduce a size of an image, and a representative function may be using linear travelling and refractive properties of light. With the above-described functions, an image size of light passing through the lens may be enlarged or reduced. Also, when a lens is used, a field of view may be different from an actual field of view, and accordingly, a lens may capture a wider or further magnified image than an actual image viewed by the human eye. However, when light is refracted, light may not converge at one point and may be spread or distorted, and this phenomenon may be known as aberration. Due to aberration, images may be distorted when images are captured by a lens, and sharpness may be affected, so that resolution may degrade. To address such an issue, a combination of various lenses may be used, and by various lenses used in a camera, aberration may be corrected.

However, light incident to a lens may cause internal reflection on a surface or an internal wall of the lens. Such light may cause a flare phenomenon an image captured by the lanes, and to prevent such a phenomenon, it may be necessary to significantly reduce light transmittance and light reflectance in the visible ray region.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens includes a lens unit including an uneven surface structure; and an uneven layer formed on at least a portion of the uneven surface structure of the lens unit and including an uneven surface structure, wherein the uneven surface structure of the lens unit and the uneven surface structure of the uneven layer have different shapes.

A distance from a lowermost end to an uppermost end of the uneven surface structure of the lens unit may be greater than a distance from an uppermost end of the uneven surface structure of the lens unit to an uppermost end of the uneven surface structure of the uneven layer.

A distance from a lowermost end to an uppermost end of the uneven surface structure of the lens unit may be smaller than a distance from an uppermost end of the uneven surface structure of the lens unit to an uppermost end of the uneven surface structure of the uneven layer.

The lens may further include a base layer disposed between the lens unit and the uneven layer and filling the uneven surface structure of the lens unit.

The base layer may include an uneven surface structure having a shape that may be different from the shape of the uneven surface structure of the lens unit.

The base layer may include a $SiO_2$ layer.

The uneven surface structure of the lens unit may have an irregular shape.

The uneven surface structure of the uneven layer may have an irregular shape.

The uneven layer may include a cavity formed by at least a portion of the uneven surface structure.

The uneven surface structure of the uneven layer may have a surface roughness of 10 nm or more to 100 nm or less.

The uneven layer may include an $Al_2O_3$ layer.

The lens may further include a water-repellent layer disposed on the uneven layer.

The water-repellent layer may conform to a shape of a surface of the uneven layer.

The lens may further include a buffer layer disposed between the uneven layer and the water-repellent layer.

The uneven surface structure of the lens unit may be formed on both one surface of the lens unit and another surface of the lens unit opposing the one surface of the lens unit.

The uneven layer may be formed on both at least a portion of the uneven surface structure of the lens unit formed on the one surface of the lens unit and at least a portion of the uneven surface structure of the lens unit formed on the other surface of the lens unit opposing the one surface of the lens unit.

The uneven layer may be formed on one surface of the lens unit, and at least one reflective layer may be formed on another surface of the lens unit opposing the one surface of the lens unit.

In another general aspect, a lens assembly includes one or more lenses disposed on an optical axis of the lens assembly, wherein at least one of the one or more lenses is a low-reflection lens, the low-reflection lens includes a lens unit including an uneven surface structure; and an uneven layer formed on at least a portion of the uneven surface structure of the lens unit and including an uneven surface structure, and the uneven surface structure of the lens unit and the uneven surface structure of the uneven layer are low-reflection surfaces structures having different shapes.

The low-reflection lens may be disposed on an outermost side of the lens assembly closest to an incident side of the lens assembly, among the at least one lens, in a direction of the optical axis.

In another general aspect, a mobile electronic device includes a display unit; and a lens assembly, wherein the lens assembly includes one or more lenses disposed on an optical axis of the lens assembly, at least one of the one or more lenses is a low-reflection lens, the low-reflection lens includes a lens unit including an uneven surface structure; and an uneven layer formed on at least a portion of the uneven surface structure of the lens unit and including an uneven surface structure, and the uneven surface structure of the lens unit and the uneven surface structure of the uneven layer are low-reflection surface structures having different shapes.

The low-reflection lens may be disposed on an outermost side of the lens assembly closest to an incident side of the lens assembly, among the one or more lenses, in a direction of the optical axis.

The incident side of the lens assembly may be covered with the display unit.

The incident side of the lens assembly may be covered with tempered glass.

In another general aspect, a low-reflection lens includes a lens unit including a low-reflection surface structure; and a low-reflection layer disposed on at least a portion of the low-reflection surface structure of the lens unit and including a low-reflection surface structure, wherein the low-reflection surface structure of the lens unit and the low-reflection surface structure of the low-reflection layer have different shapes.

The low-reflection surface structure of the lens unit may have an irregular surface, and the low-reflection surface structure of the low-reflection layer may have an irregular surface having a shape that is different from a shape of the irregular surface of the low-reflection surface structure of the lens unit.

The low-reflection lens may further include a base layer disposed between the lens unit and the low-reflection layer, wherein the base layer may fill the irregular surface of the low-reflection surface structure of the lens unit, and may include a low-reflection surface structure having an irregular surface contacting the low-reflection layer, and a shape of the irregular surface of the low-surface surface structure of the base layer may be different from the shape of the irregular surface of the low-reflection surface structure of the lens unit and the shape of the irregular surface of the low-reflection surface structure of the low-reflection layer.

The low-reflection lens may further include a water-repellent layer disposed on the irregular surface of the low-reflection surface structure of the low-reflection layer and having a shape conforming to the shape of the irregular surface of the low-reflection surface structure of the low-reflection layer.

The low-reflection lens may further include a buffer layer disposed between the low-reflection layer and the water-repellent layer and having a shape conforming to the shape of the irregular surface of the low-reflection surface structure of the low-reflection layer.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
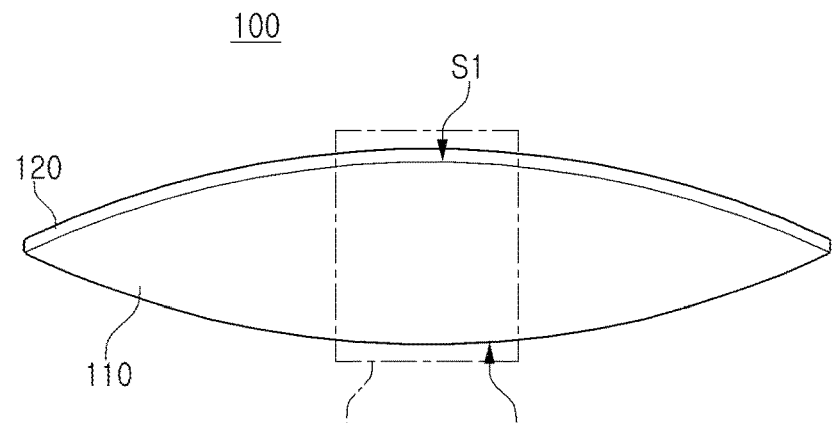
FIG. 1 is a schematic cross-sectional view illustrating a lens according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 2:
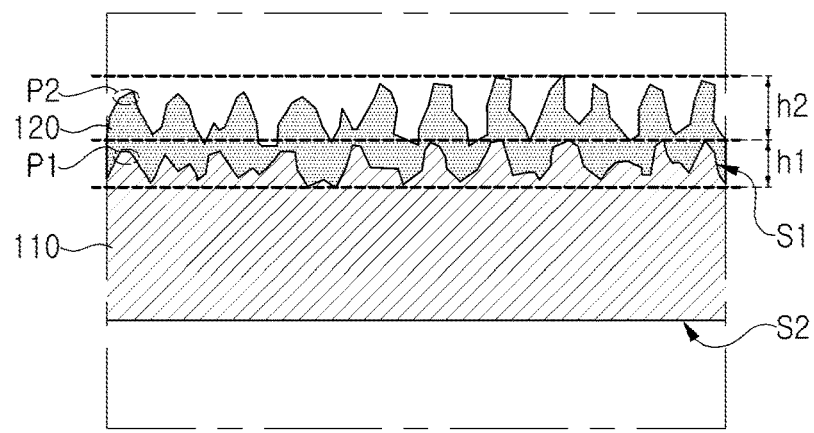
FIGS. 2 and 3 are enlarged views of a region A in FIG. 1 illustrating examples of the lens in FIG. 1.
Figure 3:
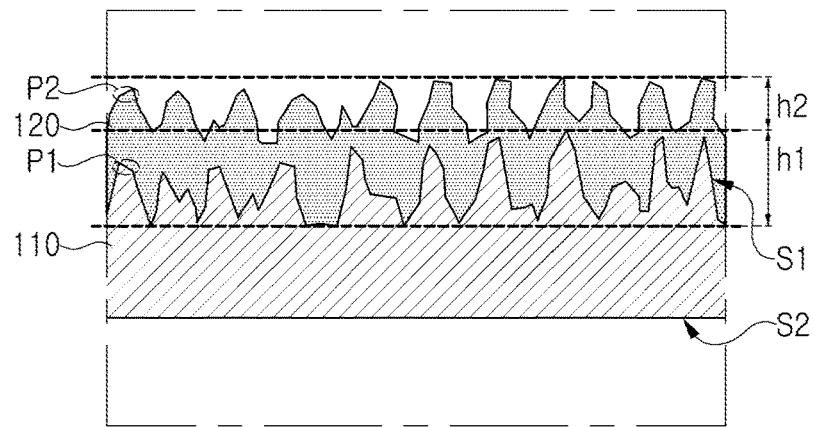

FIG. 1 is a schematic cross-sectional view illustrating a lens according to an embodiment. FIGS. 2 and 3 are enlarged views of a region A of the lens in FIG. 1 illustrating examples of the lens in FIG. 1.

Referring to FIGS. 1 and 2, a lens 100 according to an embodiment may include a lens unit 110 and an uneven layer 120. An uneven surface structure P1 of the lens unit 110 and an uneven surface structure P2 of the uneven layer 120 have different shapes.

A shape or type of the lens unit 110 is not limited to any particular example, and the lens unit 110 may be implemented in the form of a lens used in an optical device such as a camera module. Accordingly, the shape of the lens unit 110 may be modified to have a shape other than the example illustrated in FIG. 1. The lens unit 110 may be made of plastic resin including a resin component. For example, the plastic resin may include either one or both of polycarbonate and polyolefin. Polyolefin may include either one or both of a cycloolefin polymer and a cycloolefin copolymer.

In the present embodiment, the lens unit 110 may have an uneven surface structure P1. In this case, the uneven surface structure P1 may be formed on one surface S1 of the one surface S1 and another surface S2 of the lens unit 110 as illustrated in FIGS. 2 and 3. The lens unit 110 has the uneven surface structure P1, so that a thickness (or a height) of the uneven structure may be increased overall together with the uneven surface structure P2 of the uneven layer 120. As described above, the thickness of the uneven structure is increased, so that an average refractive index of the lens unit 110 and the uneven layer 120 may be decreased overall, resulting in reduced reflectance of the lens 100. In addition to the uneven surface structure P2 of the uneven layer 120, the uneven surface structure P1 is formed on the lens unit 110, so that a gradient refractive index zone in which the refractive index is gradually changed may be divided into two zones. Thus, an effect of reducing reflectance may be further enhanced.

The uneven surface structure P1 of the lens unit 110 may be formed by etching the lens unit 110 with a chemical etchant, and thus may have an irregular shape. However, the uneven surface structure may be formed using other appropriate processes, other than such a chemical etching process. The uneven surface structure P1 of the lens unit 110 may have a nanostructure.

The uneven layer 120 may be formed on at least a portion of the uneven surface structure P1 of the lens unit 110, and may have an uneven surface structure P2. In FIG. 1, the uneven layer 120 is illustrated as covering an entire uneven surface structure P1 on one surface S1 of the lens unit 110, but may cover only a portion of the uneven surface structure P1. The reflectance of the lens 100 may be reduced by the uneven surface structure P2 of the uneven layer 120. The reason for this is that the respective refractive indices of the uneven layer 120 and air, which are different materials, may be combined to reduce an average refractive index, which lowers the reflectance as incident light is scattered by the uneven layer 120. In the present embodiment, since the uneven surface structure P1 is formed on the lens unit 110 other than the uneven surface structure P2 of the uneven layer 120, the reflectance of the lens 100 may be significantly reduced. In the related art, it may be difficult to implement a reflectance of 2% or less through a reflective coating layer on a surface of a lens. In contrast, in the present embodiment, the reflectance of the lens 100 may be reduced through the uneven surface structure P2 of the uneven layer 120. For example, a reflectance of 2% or less, or more specifically, 0.5% or less, may be implemented. The uneven surface structure P2 of the uneven layer 120 may have a nanostructure.

In the present embodiment, the surface of the uneven surface structure P1 of the lens unit 110 and the surface of the uneven structure P2 of the uneven layer 120 have different shapes, which means that the uneven layer 120 is not formed to conform to a shape of the uneven surface structure P1 of the lens unit 110. When the uneven layer 120 conforms to the shape of the uneven surface structure P1 of the lens unit 110, it may be difficult to secure the overall uneven structure of the surface of the lens 100 to have a sufficient thickness, and it may be difficult to significantly cause the above-described effect of reducing reflectance. In this regard, in the present embodiment, the uneven surface structure P1 of the lens unit 110 and the uneven surface structure P2 of the uneven layer 120 may be formed to have different shapes, rather than the uneven layer 120 conforming to the shape of the uneven surface structure P1 of the lens unit 110. In this case, sizes of the uneven surface structure P1 of the lens unit 110 and the uneven surface structure P2 of the uneven layer 120 may be appropriately adjusted to satisfy intended refractive index conditions. For example, as illustrated in FIG. 2, a distance h1 from a lowest end to an uppermost end of the uneven surface structure P1 of the lens unit 110 may be greater than a distance h2 from an uppermost end of the uneven surface structure P1 of the lens unit 110 to an uppermost end of the uneven surface structure P2 of the layer 120. Alternatively, as illustrated in FIG. 3, a distance h1 from a lowest end to an uppermost end of the uneven surface structure P1 of the lens unit 110 may be smaller than a distance h2 from an upper end of the uneven surface structure P1 of the lens unit 110 to an uppermost end of the uneven surface structure P2 of the uneven layer 120.

When the uneven surface structure P2 of the uneven layer 120 is irregular, rather than being regular, incident light rays may be scattered to be more irregular and may cancel each other, so that the effect of reducing reflectance may be further enhanced. Accordingly, in the present embodiment, as illustrated in FIGS. 2 and 3, the uneven layer 120 may have the uneven surface structure P2 having an irregular shape.

Figure 4:
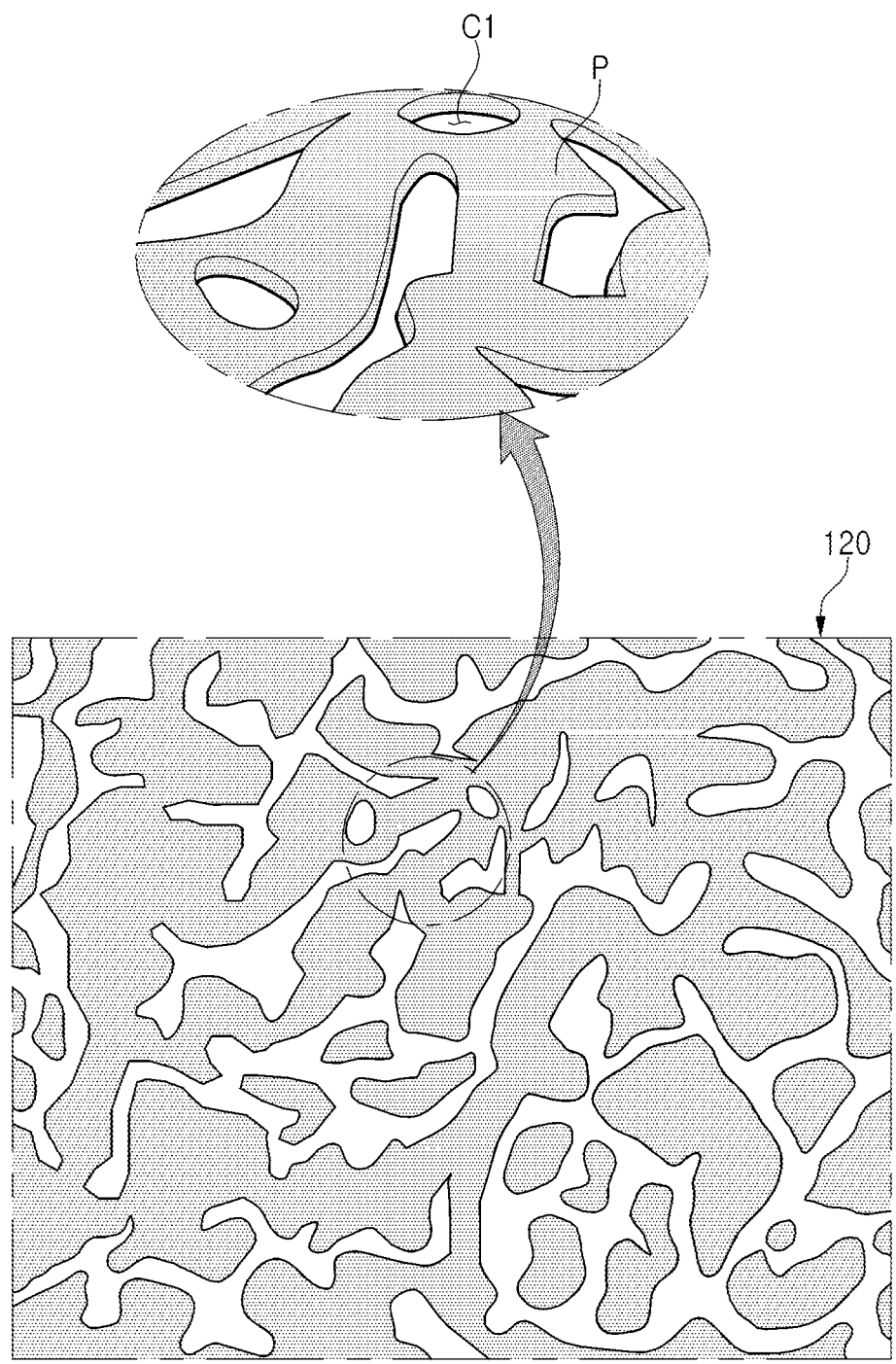
FIG. 4 is a schematic view of an irregular uneven surface structure of the uneven layer of FIGS. 2 and 3 when viewed from above.

FIG. 4 is a schematic view of an irregular uneven surface structure of the uneven layer of FIGS. 2 and 3 when viewed from above.

Referring to FIG. 4, the uneven layer 120 may have a cavity Cl formed by at least a portion of a protrusion P of the uneven surface structure P2.

A surface roughness of the uneven surface structure P2 of the uneven layer 120 may be increased to have a roughness of 10 nm or more. The term "roughness" may refer to an arithmetic mean roughness, for example, Ra. The surface roughness Ra of the uneven surface may be measured by an atomic force microscope (AFM) with respect to a sampled region (for example, a sampled region having a size of 5 μm×5 μm). When the surface roughness Ra is not increased as in a reflective coating film according to the related art, the surface roughness Ra is only at a level of 2 nm. In addition, even when the surface roughness Ra in the related art is high, it may be difficult for the surface roughness Ra to be higher than a level of 10 nm. In the present embodiment, the reflectance of the lens 100 may be reduced by setting the uneven surface structure P2 of the uneven layer 120 to have a high surface roughness Ra, for example, a surface roughness Ra of 10 nm or more. In addition, the surface roughness Ra of the uneven surface structure P2 of the uneven layer 120 may be set to 100 nm or less. When the surface roughness Ra is greater than 100 nm, a refractive index may tend to increase again as an overall thickness of the surface structure increases. In this case, a difference in refractive indices between the uneven layer 120 and the lens unit 110 may be decreased to cause difficulty in reducing reflectance.

The uneven layer 120 may include a material layer having high reflectance in a visible light region, for example, an $Al_2O_3$ layer. In detail, the $Al_2O_3$ layer may be formed by various deposition methods such as atomic layer deposition (ALD), physical vapor deposition (PVD), or another suitable deposition method. In addition, a method of forming an aluminum (Al) layer and then oxidizing the Al layer to be an $Al_2O_3$ layer may be used. In the present embodiment, the $Al_2O_3$ layer of the uneven layer 120 may be subjected to a post-treatment process to increase the surface roughness Ra. For example, a method of immersing the $Al_2O_3$ layer in hot water of about 40 to 80° C. or putting the $Al_2O_3$ layer in a chamber for applying high humidity and temperature may be used.

FIGS. 5 to 8 are enlarged views of the region A of the lens in FIG. 1 illustrating modified examples of the lens in FIG. 1.

Figure 5:
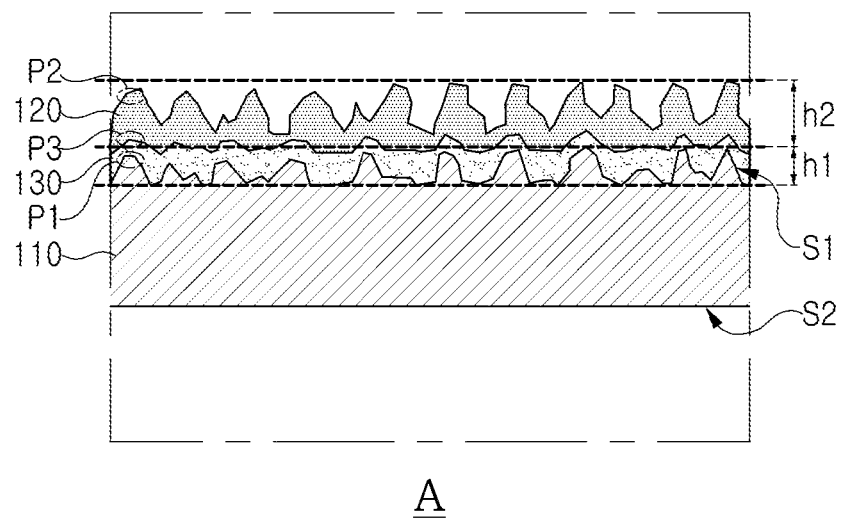
FIGS. 5 to 8 are enlarged views of the region A of the lens in FIG. 1 illustrating modified examples of the lens in FIG. 1.
Figure 6:
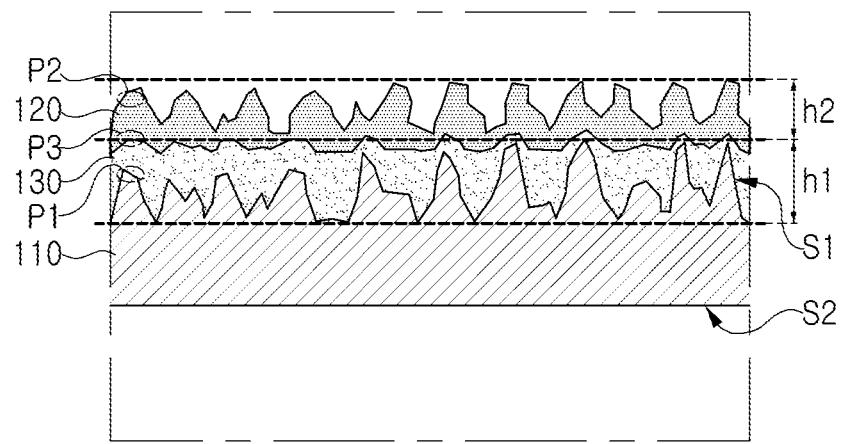

FIGS. 5 and 6 illustrate a structure in which a base layer 130 is additionally provided. The uneven surface structures P1 and P2 of the lens unit 110 and the uneven layer 120 may satisfy a thickness condition of h1<h2 in FIG. 5 and a thickness condition of h1>h2 in FIG. 6, which may also be applied to the following examples. In the modified examples of FIGS. 5 and 6, a base layer 130 disposed between the lens unit 110 and the uneven layer 120 may be additionally provided. In this case, the base layer 130 may fill the uneven surface structure P1 of the lens unit 110. Similarly to the uneven layer 120, the base layer 130 may have an uneven surface structure P3 having a shape different from a shape of the uneven surface structure P1 of the lens unit 110. The base layer 130 may be additionally provided to further reduce reflectance of the lens 100 and to stably form the uneven layer 120. The base layer 130 may include a $SiO_2$ layer, and may have a thickness of 200 nm or less in consideration of a reflection reducing function, or other considerations. In this case, the base layer 130 may be formed to have a multilayer structure, rather than a single-layer structure, to further reduce reflectance. For example, the base layer 130 may have a stack structure in which a $SiO_2$ layer and a $TiO_2$ layer are stacked.

Figure 7:
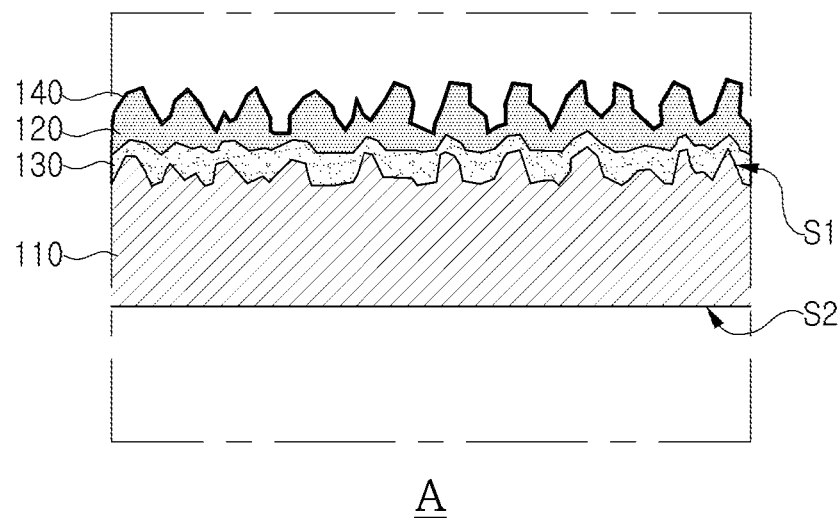

FIG. 7 illustrates a structure in which a water-repellent layer 140 is additionally provided to cover the uneven layer 120. The water-repellent layer 140 may be employed to prevent oxidation of a surface of the uneven layer 120, and may conform to a shape of the surface of the uneven layer 120 as illustrated in FIG. 7. Reflectance may be reduced due to an uneven surface structure of the uneven layer 120. However, when the surface of the uneven layer 120 is oxidized, the thickness of the uneven layer 120 may be changed to increase the reflectance again. For example, as a surface area of the uneven layer 120 is increased by the uneven surface structure P2, such a phenomenon may be further accelerated. By employing the water-repellent layer 140, a repulsive force to a hydroxyl group may be increased to reduce, in particular, surface oxidation in the uneven structure of the uneven layer 120. Thus, an increase in reflectance of the lens 100 may be significantly reduced. The water-repellent layer 140 may include a fluorocarbon component having a silicon (Si) head group as an example of a material forming the water-repellent layer 140. Accordingly, the water-repellent layer 140 may form a chemical bond with the uneven layer 120.

Figure 8:
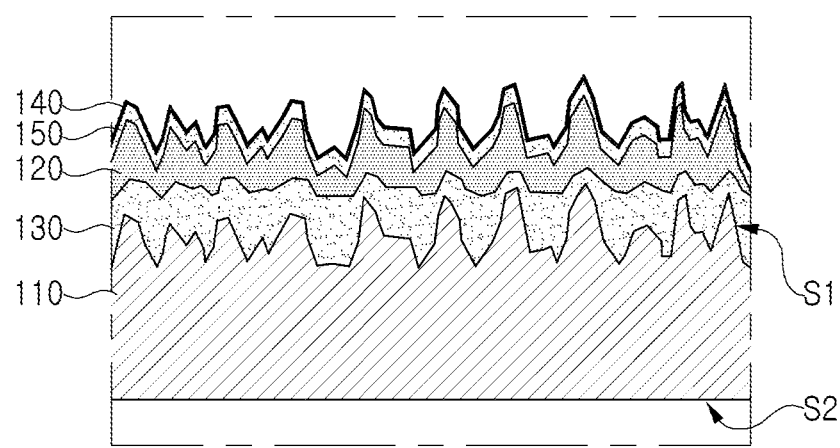

FIG. 8 illustrates an example in which a buffer layer 150 is further formed between the uneven layer 120 and the water-repellent layer 140. As described above, the water-repellent layer 140 may include a fluorocarbon component having a silicon (Si) head group. In this case, the water-repellent layer 140 may form a chemical bond with the buffer layer 150. For example, the Si head group of the water-repellent layer 140 may combine with a surface oxygen group of the buffer layer 150 to form a chemical bond. To this end, the buffer layer 150 may include a Si component. The water-repellent layer 140 may form a chemical bond with the buffer layer 150, resulting in improved structural stability and uniform thickness of the water-repellent layer 140. The buffer layer 150 may cover the uneven layer 120, and may be disposed between the uneven layer 120 and the water-repellent layer 140. The buffer layer 150 may be formed to conform to a shape of an uneven surface of the uneven layer 120. Thus, the buffer layer 150 may maintain the uneven surface having an overall high level of roughness Ra. In the present embodiment, the buffer layer 150 may have a thickness greater than a thickness of the water-repellent layer 140, while conforming to the shape of the uneven surface of the uneven layer 120. When the buffer layer 150 is formed on the surface of the uneven layer 120, the buffer layer 150 may prevent the uneven layer 120 from being excessively oxidized. In addition, when the buffer layer 150 conforms to a shape of the uneven surface structure of the uneven layer 120, an overall uneven surface structure of the lens 100 may be maintained to further reduce the reflectance of the lens 100. Moreover, by employing the buffer layer 150, the water-repellent layer 140 disposed thereon may be formed to be overall uniform with a sufficient thickness.

The buffer layer 150 may be formed using a process such as chemical vapor deposition (CVD), physical vapor deposition (PVD), or suitable processes. In this case, in terms of forming the buffer layer 150 to conform to the shape of the uneven surface structure of the uneven layer 120, a CVD process may be more appropriate than a PVD process. It may be difficult to use an evaporation process, a sputtering process, or other PVD process to deposit the buffer layer 150 to conform to the shape of the uneven surface structure. In the CVD process, compared with the PVD process, a material to be deposited may be deposited through a chemical reaction, so that the buffer layer 150 may be deposited while conforming to a surface of an uneven surface structure. In this case, it may be advantageous to use a process appropriate for conformal coating. For example, the buffer layer 150 may be formed using atomic layer deposition (ALD), molecular vapor deposition (MVD), or another appropriate process. The buffer layer 150 may be formed of a material which may be deposited by a deposition process such as CVD, ALD, or MVD. For example, the buffer layer 150 may be formed of a material such as siloxane, $SiO_2$, SiON, $Si_3N_4$, $TiO_2$, TiON, or TiN, or a plurality of such materials may be mixed to form the buffer layer 150. In particular, when the buffer layer 150 includes a Si group, the buffer layer 150 may more effectively combine with the water-repellent layer 140.

A thickness of the water-repellent layer 140 may be measured using a non-destructive inspection or a destructive inspection. However, when the water-repellent layer 140 is very thin, it may be difficult to use such a thickness measurement method. In this case, energy-dispersive X-ray spectroscopy (EDS) analysis may be performed in a thickness direction during a transmission electron microscopy (TEM) analysis, so that a component of the water-repellent layer 140, for example, a fluorine component, may be checked to distinguish the water-repellent layer 140 from the other layers. The above-mentioned thickness measurement methods may also be applied to the buffer layer 150 and the other layers in addition to the water-repellent layer 140.

When the water-repellent layer 140 is very thick, an anti-reflection performance of the surface structure of the lens 100 may be deteriorated. When the buffer layer 150 is formed to be thicker than the water-repellent layer 140, low-reflection characteristics and structural stability of the lens 100 may be improved. However, when the buffer layer 150 is too thick to maintain the uneven surface of the uneven layer 120, the reflectance may be increased again. Therefore, the thickness of the buffer layer 150 may be adjusted so that the buffer layer conforms to the shape of the uneven surface of the uneven layer 120. The thickness of the buffer layer 150 may be measured using both a non-destructive inspection and a destructive inspection. Examples of the non-destructive inspection may include an ellipsometer, a reflectometer, other suitable non-destructive inspection methods. As an example of the destructive analysis, a TEM analysis may be performed after the buffer layer 150 is sectioned using a focused ion beam (FIB) process, and a cross-section of the buffer layer 150 may be taken to include a central portion of the lens unit 110, for example, a thickest region of the lens unit 110. In addition, the thickness of the buffer layer 150 may be defined as a distance measured in a direction perpendicular to the surface of the uneven layer 120, and may be determined as an average of values measured in a plurality of regions disposed at regular intervals.

FIGS. 9 to 16 are enlarged views of the region A of the lens in FIG. 1 illustrating additional modified examples of the lens in FIG. 1.

Figure 9:
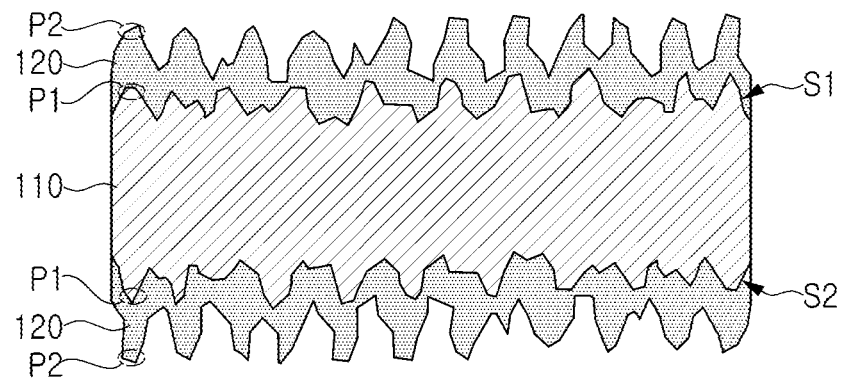
FIGS. 9 to 16 are enlarged views of the region A of the lens in FIG. 1 illustrating additional modified examples of the lens in FIG. 1.
Figure 10:
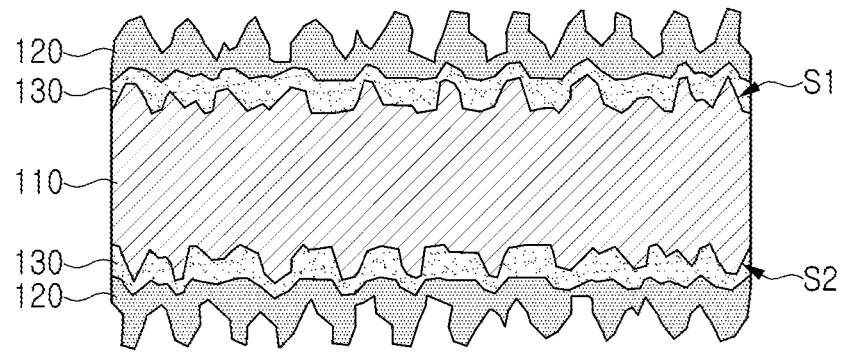
Figure 11:
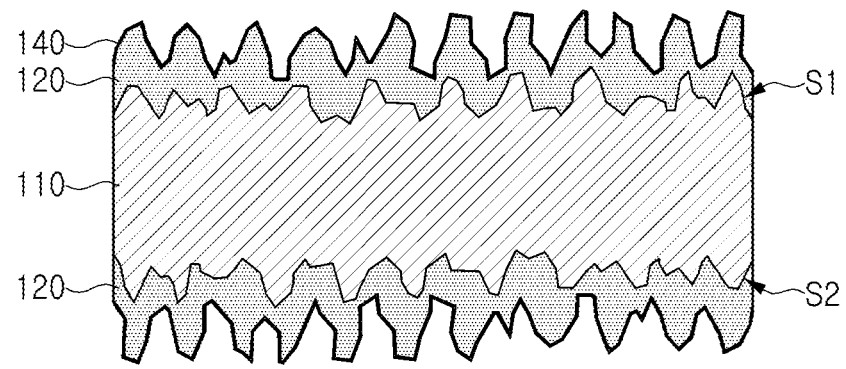
Figure 12:
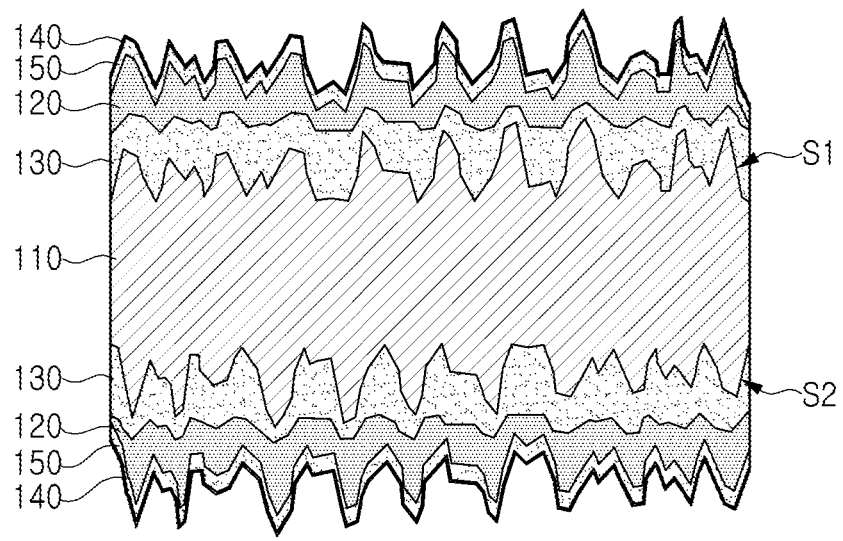
Figure 13:
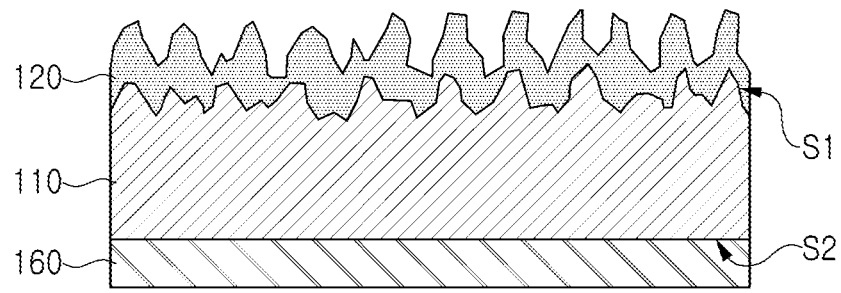
Figure 14:
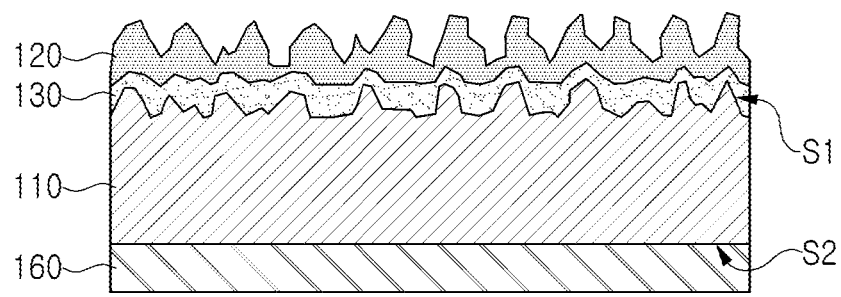

In a modified example of FIG. 9, an uneven surface structure P1 of a lens unit 110 may be formed on both one surface S1 of the lens unit 110 and the other surface S2 of the lens unit 110 opposing the one surface S1. An uneven layer 120 may be formed on the one surface S1 of the lens unit 110 and the other surface S2 opposing the one surface S1. For example, the uneven layer 120 may cover the lens unit 110 on both surfaces S1 and S2 of the lens unit 110. In the present modified example, the uneven surface structure P1 and the uneven layer 120 may be disposed on both surfaces S1 and S2 of the lens unit 110 to further reduce overall reflectance of the lens 100. In addition, in the modified example of FIG. 10, a base layer 130 may be disposed on both surfaces S1 and S2 of the lens unit 110. The description of the base layer 130 provided above with respect to FIGS. 5 and 6 is also applicable to the base layer 130 in FIG. 10. Similarly, a modified example of FIG. 11 illustrates a structure in which a water-repellent layer 140 is disposed on both surfaces S1 and S2 of a lens unit 110, and a modified example of FIG. 12 illustrates a structure in which a buffer layer 150 is disposed on both surfaces S1 and S2 of a lens unit 110.

Figure 15:
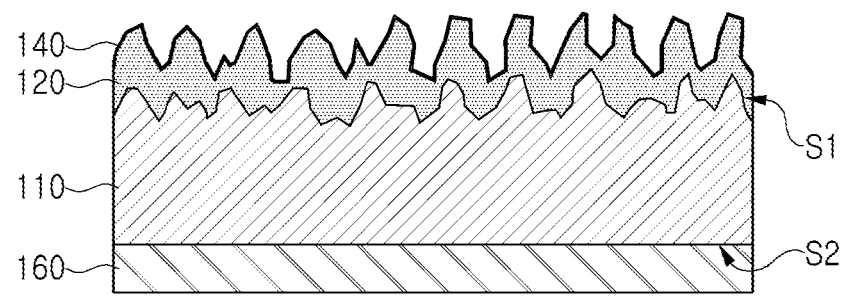
Figure 16:
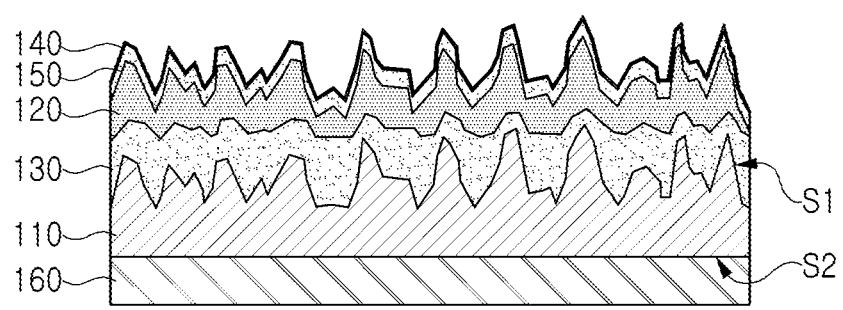

Unlike the above-described modified examples of FIGS. 9 to 12, the layers disposed on the one surface S1 and the other surface S2 of the lens unit 110 may have different structures in other examples. For example, in the modified example of FIG. 13, the uneven layer 120 may be formed on one surface S1 of the lens unit 110 and at least one reflective layer 160 may be formed on the other surface S2 of the lens unit 110. The reflective layer 160 may include a $SiO_2$ layer. Alternatively, the reflective layer 160 may have a multilayer structure, for example, a stack structure in which a $SiO_2$ layer and a $TiO_2$ layer are stacked. In the modified example of FIG. 14, a base layer 130 may be disposed on one surface S1 of a lens unit 110. The description of the base layer 130 provided above with respect to FIGS. 5 and 6 is also applicable to the base layer 130 in FIG. 14. Similarly, a modified example of FIG. 15 illustrates a structure in which a water-repellent layer 140 is disposed on one surface S1 of a lens unit 110, and a modified example of FIG. 16 illustrates a structure in which a buffer layer 150 is disposed on one surface S1 of a lens unit 110.

Figure 17:
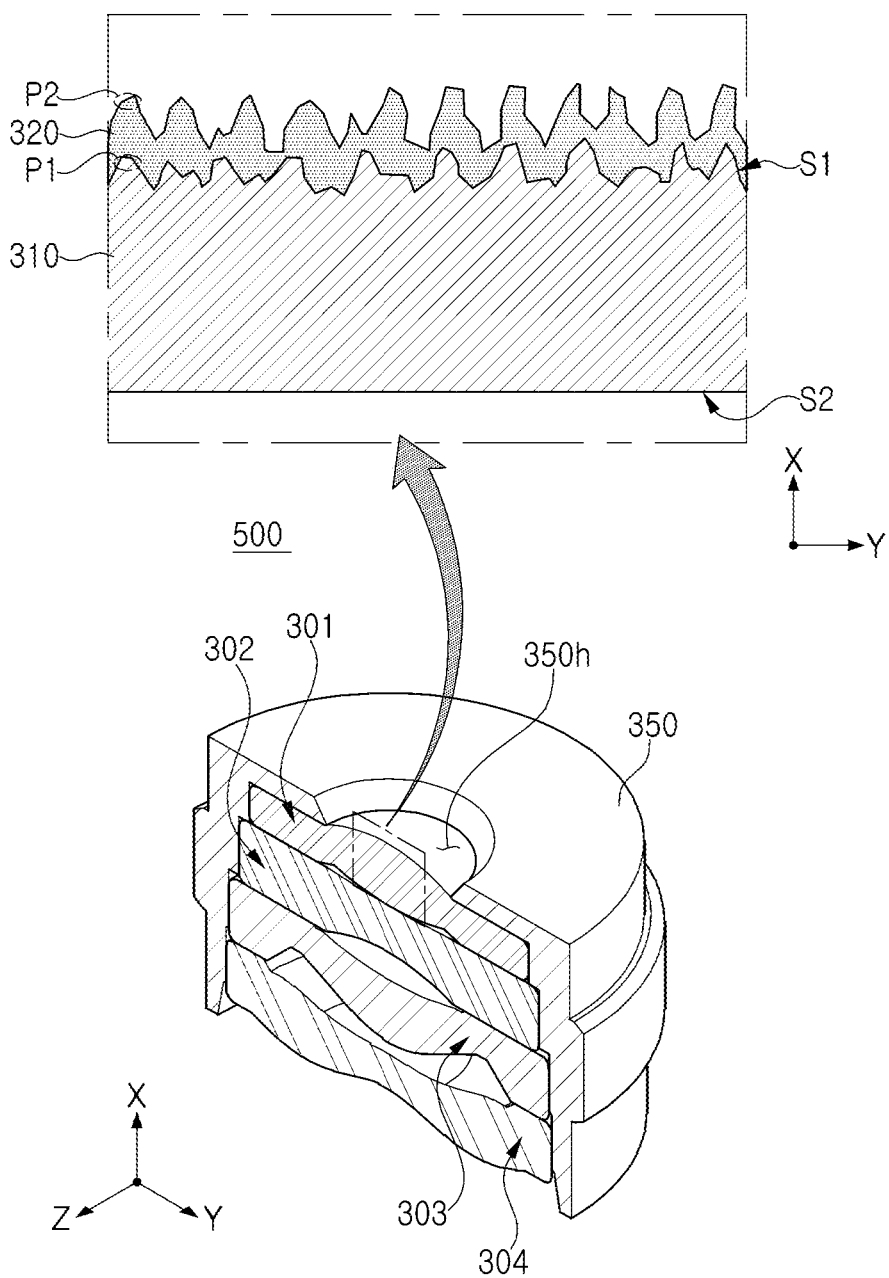
FIG. 17 is a schematic cutaway perspective view illustrating a lens assembly.

FIG. 17 is a schematic cutaway perspective view illustrating a lens assembly.

In the present embodiment, a lens assembly 500 may include one or more lenses 301 to 304. In the present embodiment, the lens assembly 500 includes four lenses 301 to 304, but the number or shape of the lenses 301 to 304 may vary depending on required functions or size conditions. The lens assembly 500 may include a lens barrel 350 in which the plurality of lenses 301 to 304 may be disposed. The lens barrel 350 may have a hollow cylindrical shape, and a lens hole 350h for transmitting light may be formed to penetrate through one surface of the lens barrel 350. Among the plurality of lenses 301 to 304, at least one lens 301 may be a low-reflection lens according to any of the Examples of FIGS. 2, 3, and 5 to 16. For example, as illustrated in the FIG. 17, the lens 301 may be a low-reflection lens 301 including a lens unit 310 and an uneven layer 320. An uneven surface structure P1 of the lens unit 310 and an uneven surface structure P2 of the uneven layer 320 may have different shapes as shown, for example, in FIG. 2. In this case, the low-reflection lens 301, among the plurality of lenses 301 to 304, may be disposed on a side of the lens assembly 500 on which light is incident, for example, on an outermost side of the lens assembly 500 in an optical axis direction (an X-direction with respect to FIG. 17). Since a reflectance of the lens 301 disposed on the outermost side of the lens assembly 500, among the plurality of lenses 301 to 304, has a greatest effect on an overall reflectance of the lens assembly 500, the low-reflection lens 301 may be employed on the outermost side, as in the present embodiment, to significantly increase a reflectance reducing effect of the lens assembly 500.

The low-reflection lens 301 may have various structures (for example, the structures illustrated in FIGS. 3 and 5 to 16), other than the structure illustrated in FIG. 17, which is the structure illustrated in FIG. 2. In addition, a surface structure like the surface structure of the low-reflection lens 301 may be applied to at least one of the other lenses 302 to 304, other than the lens 301 disposed on the outermost side, to further reduce a reflectance of the lens assembly 500. Such various modified structures of the lens assembly 500 may be applied to a mobile electronic device to be described below.

Figure 18:
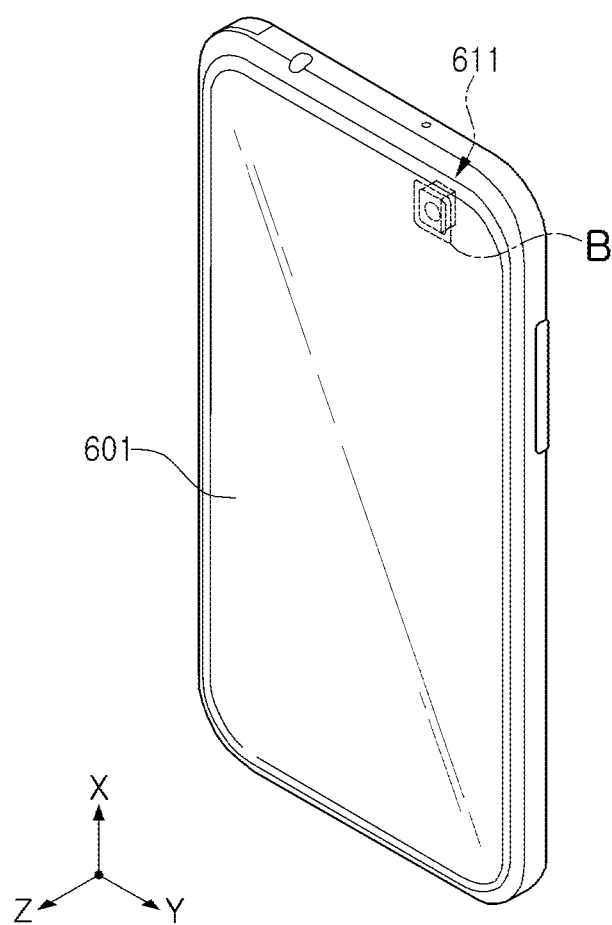
FIGS. 18 and 19 are schematic perspective views respectively illustrating a front side and a rear side of a mobile electronic device.
Figure 19:
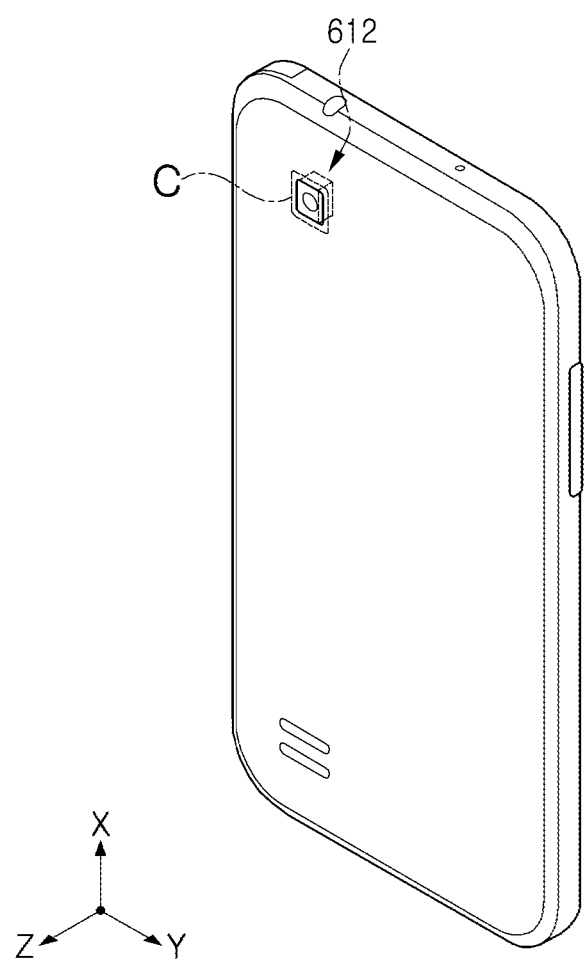
Figure 20:
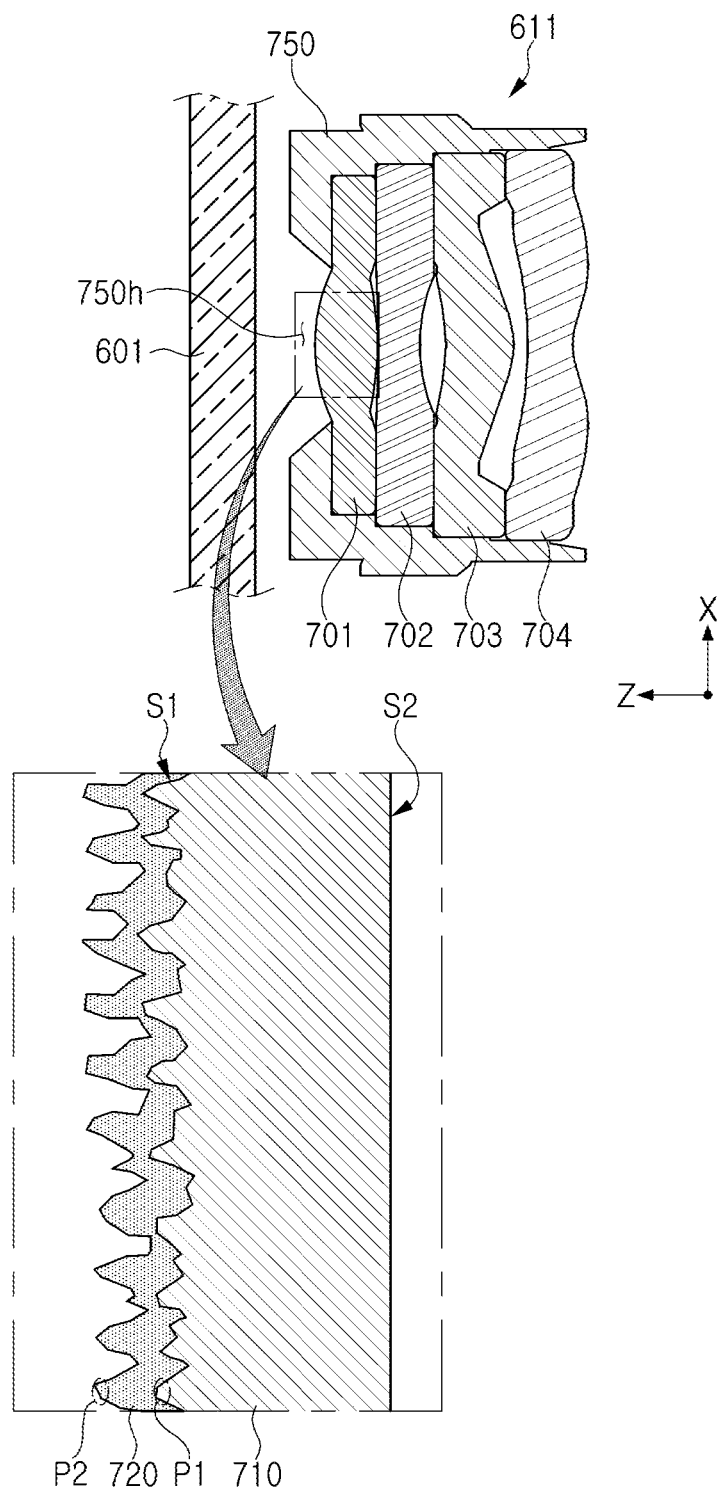
FIGS. 20 and 21 are enlarged cross-sectional views respectively illustrating lens assemblies in FIGS. 18 and 19 in regions B and C of the mobile electronic device.
Figure 21:
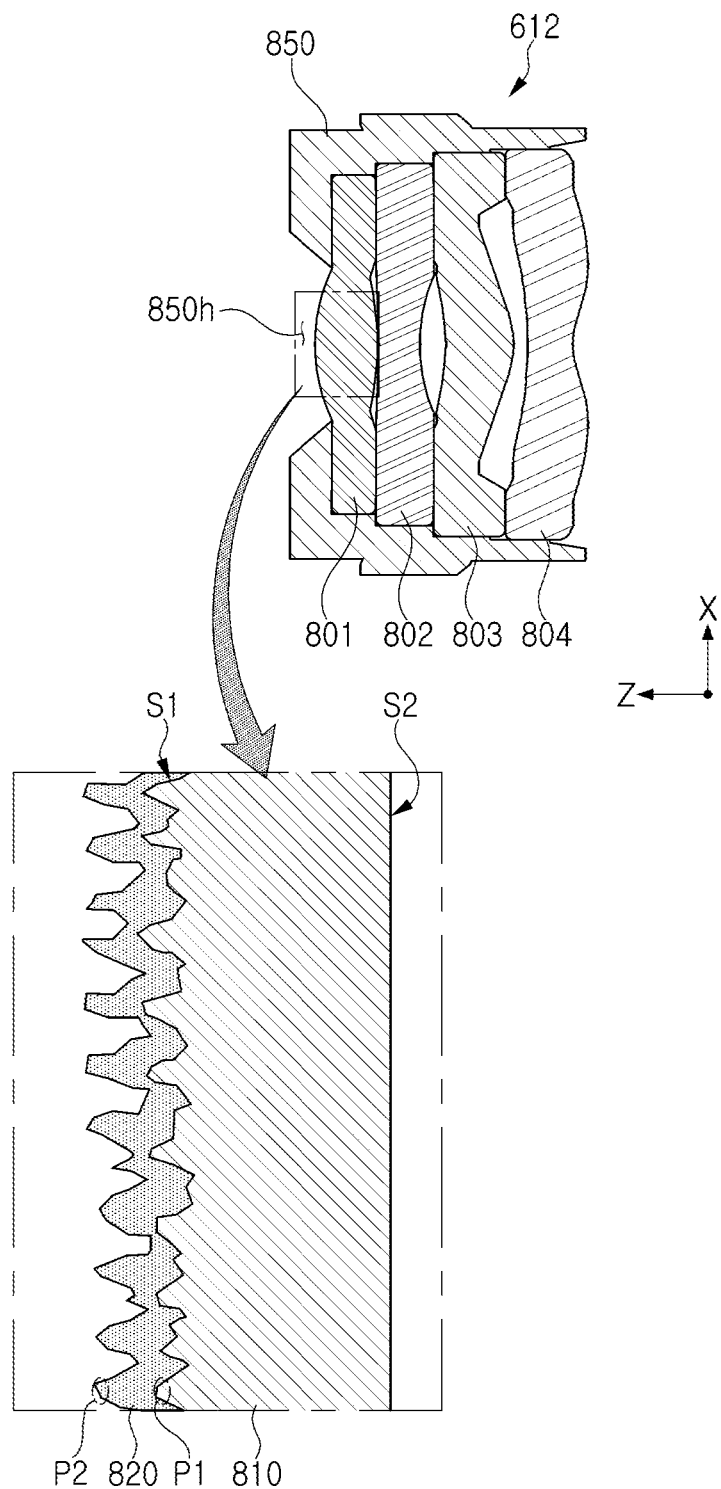

FIGS. 18 and 19 are schematic perspective views respectively illustrating a front side and a rear side of a mobile electronic device. FIGS. 20 and 21 are enlarged cross-sectional views respectively illustrating lens assemblies in FIGS. 18 and 19 in regions B and C of the mobile electronic device.

A mobile electronic device 600 may be any of various electronic devices such as a smartphone, a tablet PC, and a laptop computer. In the embodiment in FIGS. 18 to 21, a smartphone will be described as an example. The mobile electronic device 600 may include a display unit 601, a first lens assembly 611, and a second lens assembly 612 as main components. However, as necessary, only one of the first and second lens assemblies 611 and 612 may be used. In addition to the display unit 601 and the lens assemblies 611 and 612, as the other main components (for example, a processing module, a communication module, a touch sensing module, etc.) included in the mobile electronic device 600, generally used components may be used, and a detailed description thereof will be omitted.

The first and second lens assemblies 611 and 612 may have the structure described with respect to the embodiment of FIG. 17.

For example, the first lens assembly 611 may include a lens barrel 750a having a lens hole 750h, and a plurality of lenses 701 to 704. Among the plurality of lenses 701 to 704, at least one lens 701 may be a low-reflection lens according to the embodiment of FIG. 17. For example, as illustrated in the FIG. 20, the low-reflection lens 701 may include a lens unit 710 and an uneven layer 720. An uneven surface structure P1 of the lens unit 710 and an uneven surface structure P2 of the uneven layer 720 may have different shapes. In this case, the low-reflection lens 701 may be disposed on an outermost side of the first lens assembly 611, among the plurality of lenses 701 to 704, in a direction in which light is incident, for example, in an optical axis direction (a Z-direction with in FIG. 20).

Similarly, the second lens assembly 612 may include a lens barrel 850 having a lens hole 850h, and a plurality of lenses 801 to 804. Among the plurality of lenses 801 to 804, at least one lens 801 may be a low-reflection lens according to the embodiment of FIG. 17. For example, as illustrated in the FIG. 21, the low-reflection lens 801 may include a lens unit 810 and an uneven layer 820. An uneven surface structure P1 of the lens unit 810 and an uneven surface structure P2 of the uneven layer 820 may have different shapes. In this case, the low-reflection lens 801 may be disposed on an outermost side of the first lens assembly 811, among the plurality of lenses 801 to 804, in a direction in which light is incident, for example, in the optical axis direction (the Z-direction in FIG. 21).

As illustrated in the FIGS. 18 and 20, the first lens assembly 611 may be covered with the display unit 601, and more specifically, the first lens assembly 611 may be covered with a tempered glass portion of the display unit 601. However, the tempered glass covering the first lens assembly 611 need not be a portion of the display unit 601. When the first lens assembly 611 is covered with the display unit 601 as described above, the amount of light incident to the lens may be reduced, so that the reflectance of the first lens assembly 611 may have a great effect on the performance of the camera module.

For example, in the case of the front side of the mobile electronic device 600, the first lens assembly 611 may be covered with the display unit 601, which corresponds to an under-display camera (UDC) structure. The UDC structure may reduce a processing needed to form a camera hole, but as additional tempered glass is disposed on the camera to implement the UDC structure, the amount of light incident to the camera may be reduced, so that performance of a camera module including the lens assembly 611 may degrade. Therefore, when the reflectance of the lens is high in the UDC structure, the performance of the camera module may be greatly reduced.

However, in the embodiment in FIGS. 18 and 20, by disposing the low-reflection lens 701 closest to the incident side, for example, the display unit 601, a reflectance reducing effect of the first lens assembly 611 may increase, so that the performance of a camera module including the lens assembly 611 may be improved.

In the above-described example, an example in which the first lens assembly 611 is covered with the display unit 601 has been described, but in other examples, the second lens assembly 612 may also be covered with an optical element in which loss of light may occur, for example, tempered glass. In this case, the importance of the reflectance reducing effect of the second lens assembly 612 may also be even greater.

In the examples described above, a lens may have a surface structure having a low reflectance, thereby reducing lens flares.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens comprising:
    a lens unit comprising an uneven surface structure; and
    an uneven layer formed on at least a portion of the uneven surface structure of the lens unit and comprising an uneven surface structure,
    wherein the uneven surface structure of the lens unit and the uneven surface structure of the uneven layer have different shapes,
    the uneven surface structure of the lens unit comprises a plurality of protrusions,
    the uneven surface structure of the uneven layer comprises a plurality of protrusions, and
    at least one of the plurality of protrusions of the uneven layer is disposed in a region corresponding to a gap between adjacent protrusions of the plurality of protrusions of the lens unit.

2. The lens of claim 1, wherein a distance from a lowermost end to an uppermost end of the uneven surface structure of the lens unit is greater than a distance from an uppermost end of the uneven surface structure of the lens unit to an uppermost end of the uneven surface structure of the uneven layer.

3. The lens of claim 1, wherein a distance from a lowermost end to an uppermost end of the uneven surface structure of the lens unit is smaller than a distance from an uppermost end of the uneven surface structure of the lens unit to an uppermost end of the uneven surface structure of the uneven layer.

4. The lens of claim 1, further comprising a base layer disposed between the lens unit and the uneven layer and filling the uneven surface structure of the lens unit.

5. The lens of claim 4, wherein the base layer comprises an uneven surface structure having a shape that is different from the shape of the uneven surface structure of the lens unit.

6. The lens of claim 4, wherein the base layer comprises a $SiO_2$ layer.

7. The lens of claim 1, wherein the uneven surface structure of the lens unit has an irregular shape.

8. The lens of claim 1, wherein the uneven surface structure of the uneven layer has an irregular shape.

9. The lens of claim 1, wherein the uneven layer comprises a cavity formed by at least a portion of the uneven surface structure.

10. The lens of claim 1, wherein the uneven surface structure of the uneven layer has a surface roughness of 10 nm or more to 100 nm or less.

11. The lens of claim 1, wherein the uneven layer comprises an $Al_2O_3$ layer.

12. The lens of claim 1, further comprising a water-repellent layer disposed on the uneven layer.

13. The lens of claim 12, wherein the water-repellent layer conforms to a shape of a surface of the uneven layer.

14. The lens of claim 12, further comprising a buffer layer disposed between the uneven layer and the water-repellent layer.

15. The lens of claim 1, wherein the uneven surface structure of the lens unit is formed on both one surface of the lens unit and another surface of the lens unit opposing the one surface of the lens unit.

16. The lens of claim 15, wherein the uneven layer is formed on both at least a portion of the uneven surface structure of the lens unit formed on the one surface of the lens unit and at least a portion of the uneven surface structure of the lens unit formed on the other surface of the lens unit opposing the one surface of the lens unit.

17. The lens of claim 1, wherein the uneven layer is formed on one surface of the lens unit, and
at least one reflective layer is formed on another surface of the lens unit opposing the one surface of the lens unit.

18. A lens assembly comprising one or more lenses disposed on an optical axis of the lens assembly,
wherein at least one of the one or more lenses is a low-reflection lens,
the low-reflection lens comprises:
a lens unit comprising an uneven surface structure; and
an uneven layer formed on at least a portion of the uneven surface structure of the lens unit and comprising an uneven surface structure,
the uneven surface structure of the lens unit and the uneven surface structure of the uneven layer are low-reflection surfaces structures having different shapes,
the uneven surface structure of the lens unit comprises a plurality of protrusions,
the uneven surface structure of the uneven layer comprises a plurality of protrusions, and
at least one of the plurality of protrusions of the uneven layer is disposed in a region corresponding to a gap between adjacent protrusions of the plurality of protrusions of the lens unit.

19. The lens assembly of claim 18, wherein the low-reflection lens is disposed on an outermost side of the lens assembly closest to an incident side of the lens assembly, among the at least one lens, in a direction of the optical axis.

20. A mobile electronic device comprising:
a display unit; and
a lens assembly,
wherein the lens assembly comprises one or more lenses disposed on an optical axis of the lens assembly,
at least one of the one or more lenses is a low-reflection lens,
the low-reflection lens comprises:
a lens unit comprising an uneven surface structure; and
an uneven layer formed on at least a portion of the uneven surface structure of the lens unit and comprising an uneven surface structure,
the uneven surface structure of the lens unit and the uneven surface structure of the uneven layer are low-reflection surface structures having different shapes,
the uneven surface structure of the lens unit comprises a plurality of protrusions,
the uneven surface structure of the uneven layer comprises a plurality of protrusions, and
at least one of the plurality of protrusions of the uneven layer is disposed in a region corresponding to a gap between adjacent protrusions of the plurality of protrusions of the lens unit.

21. The mobile electronic device of claim 20, wherein the low-reflection lens is disposed on an outermost side of the lens assembly closest to an incident side of the lens assembly, among the one or more lenses, in a direction of the optical axis.

22. The mobile electronic device of claim 20, wherein the incident side of the lens assembly is covered with the display unit.

23. The mobile electronic device of claim 20, wherein the incident side of the lens assembly is covered with tempered glass.

24. A low-reflection lens comprising:
a lens unit comprising a low-reflection surface structure; and
a low-reflection layer disposed on at least a portion of the low-reflection surface structure of the lens unit and comprising a low-reflection surface structure,
wherein the low-reflection surface structure of the lens unit and the low-reflection surface structure of the low-reflection layer have different shapes,
the low-reflection surface structure of the lens unit comprises a plurality of protrusions,
the low-reflection surface structure of the low-reflection layer comprises a plurality of protrusions, and
at least one of the plurality of protrusions of the low-reflection layer is disposed in a region corresponding to a gap between adjacent protrusions of the plurality of protrusions of the lens unit.

25. The low-reflection lens of claim 24, wherein the low-reflection surface structure of the lens unit has an irregular surface, and
the low-reflection surface structure of the low-reflection layer has an irregular surface having a shape that is different from a shape of the irregular surface of the low-reflection surface structure of the lens unit.

26. The low-reflection lens of claim 25, further comprising a base layer disposed between the lens unit and the low-reflection layer,
    wherein the base layer fills the irregular surface of the low-reflection surface structure of the lens unit, and comprises a low-reflection surface structure having an irregular surface contacting the low-reflection layer, and
    a shape of the irregular surface of the low-surface surface structure of the base layer is different from the shape of the irregular surface of the low-reflection surface structure of the lens unit and the shape of the irregular surface of the low-reflection surface structure of the low-reflection layer.

27. The low-reflection lens of claim 26, further comprising a water-repellent layer disposed on the irregular surface of the low-reflection surface structure of the low-reflection layer and having a shape conforming to the shape of the irregular surface of the low-reflection surface structure of the low-reflection layer.

28. The low-reflection lens of claim 27, further comprising a buffer layer disposed between the low-reflection layer and the water-repellent layer and having a shape conforming to the shape of the irregular surface of the low-reflection surface structure of the low-reflection layer.

* * * * *